United States Patent [19]

Ales

[11] Patent Number: 4,786,465
[45] Date of Patent: Nov. 22, 1988

[54] METHOD FOR CONVERTING A DOWNWARD FLOW OF BYPASS COOLANT TO AN UPWARD FLOW

[75] Inventor: Matthew W. Ales, Amherst, Va.

[73] Assignee: The Babcock & Wilcox Company, New Orleans, La.

[21] Appl. No.: 110,164

[22] Filed: Oct. 19, 1987

[51] Int. Cl.⁴ .............................................. G21C 15/00
[52] U.S. Cl. .................... 376/400; 376/377; 376/390; 376/399
[58] Field of Search ............... 376/400, 260, 463, 390, 376/377, 399, 389, 203, 204, 262, 263, 285; 29/400 N

[56] References Cited

U.S. PATENT DOCUMENTS

| | | | |
|---|---|---|---|
| 4,576,778 | 3/1986 | Ferree | 376/203 |
| 4,591,068 | 5/1986 | Tolino | 376/203 |
| 4,649,609 | 3/1987 | Allison | 376/400 |
| 4,650,639 | 3/1987 | Coussau | 376/260 |
| 4,652,418 | 3/1987 | Baric | 376/260 |
| 4,693,389 | 9/1987 | Kalen | 376/203 |
| 4,716,010 | 12/1987 | Gallo | 376/260 |

Primary Examiner—Donald P. Walsh
Attorney, Agent, or Firm—Robert J. Edwards; D. Neil Lahaye

[57] ABSTRACT

A method for converting a vertically downward flow of bypass coolant through coolant flow holes in a core barrel and former plates in a nuclear reactor to a vertically upward flow. Coolant flow holes are provided in the normally solid top former plate by suitable means such as drilling. These new coolant flow holes are located so as to be substantially in coaxial alignment with the existing coolant flow holes in the intermediate and lower former plates. Existing coolant flow holes in the core barrel adjcent the top former plate are plugged. Existing coolant flow holes in the lower former plate are plugged in an alternating pattern with each fifth hole being plugged having only forty-four percent of its flow area plugged.

12 Claims, 5 Drawing Sheets

METHOD FOR CONVERTING A DOWNWARD FLOW OF BYPASS COOLANT TO AN UPWARD FLOW

BACKGROUND OF THE INVENTION

1. Field of the Invention

The present invention generally relates to the flow of bypass coolant through nuclear reactor internals and more particularly to the conversion of a downward flow to an upward flow to reduce the pressure difference between the bypass and core regions.

2. General Background

Many existing nuclear reactor internals were originally designed to be cooled by coolant bypass flow entering through the side of the core barrel adjacent the top and then flowing downwardly through holes in the former plates between the core barrel and the baffle plates. The coolant then joined the main coolant flow which flowed upward through the core region. However, the two flow directions resulted in a large pressure difference between the bypass region and the core region. This pressure differential of as much as 20 p.s.i. caused flow jetting at the gaps between adjacent baffle plates. This flow jetting resulted in damage to fuel pins which led to fuel pin failures. Attempts to reduce the pressure differential to a level which does not result in damage to fuel pins have traditionally plugged the horizontal core barrel flow holes and added vertical flow holes to the upper former plates. This form of upflow conversion results in the pressure differential being reduced from approximately 20 p.s.i. to approximately 3–4 p.s.i. However, even this reduced pressure differential still has sufficient driving pressure to cause jetting which leads to fuel pin failures for certain gap sizes between adjacent baffle plates. It can be seen that an upflow conversion method is needed which will reduce the pressure differential between the bypass and core regions to a level which does not result in jetting of coolant with subsequent fuel pin failures.

SUMMARY OF THE INVENTION

What is provided is a method of converting a vertically downward flow of bypass coolant through a core barrel and former plates in a nuclear reactor to a vertically upward flow. This method reslults in a pressure differential of approximately one-half (½) p.s.i. between the bypass and core regions. The method involves providing holes in the top former plates. Coolant flow holes in the core barrel adjacent the top former plates are plugged. Plugs are inserted through the top and intermediate former plates and used to plug selected holes in the lower former plates. Also, some holes in the lower former plates may be partially plugged. This causes a reduction in the quantity and velocity of coolant flow through the bypass region which results in a reduction in the pressure differential between the core and bypass regions to near zero. An expander tool designed to allow for a certain offset between flow holes in the former plates is used for ease of plug installation.

In view of the above, it is an object of the invention to provide an upflow conversion method which may be accomplished through the use of remotely operated tooling.

It is another object of the invention to provide an upflow conversion method which reduces the pressure differential between the core and bypass regions to near zero.

In view of the above objects, it is a feature of the invention to plug selected holes in the lower former plates.

It is another feature of the invention to partially plug selected holes in the lower former plates.

BRIEF DESCRIPTION OF THE DRAWINGS

For a further understanding of the nature and objects of the present invention, reference should be had to the following description, taken in conjunction with the accompanying drawings in which like parts are given like reference numerals and, wherein.

DETAILED DESCRIPTION OF THE PREFERRED EMBODIMENT

Figure 1:
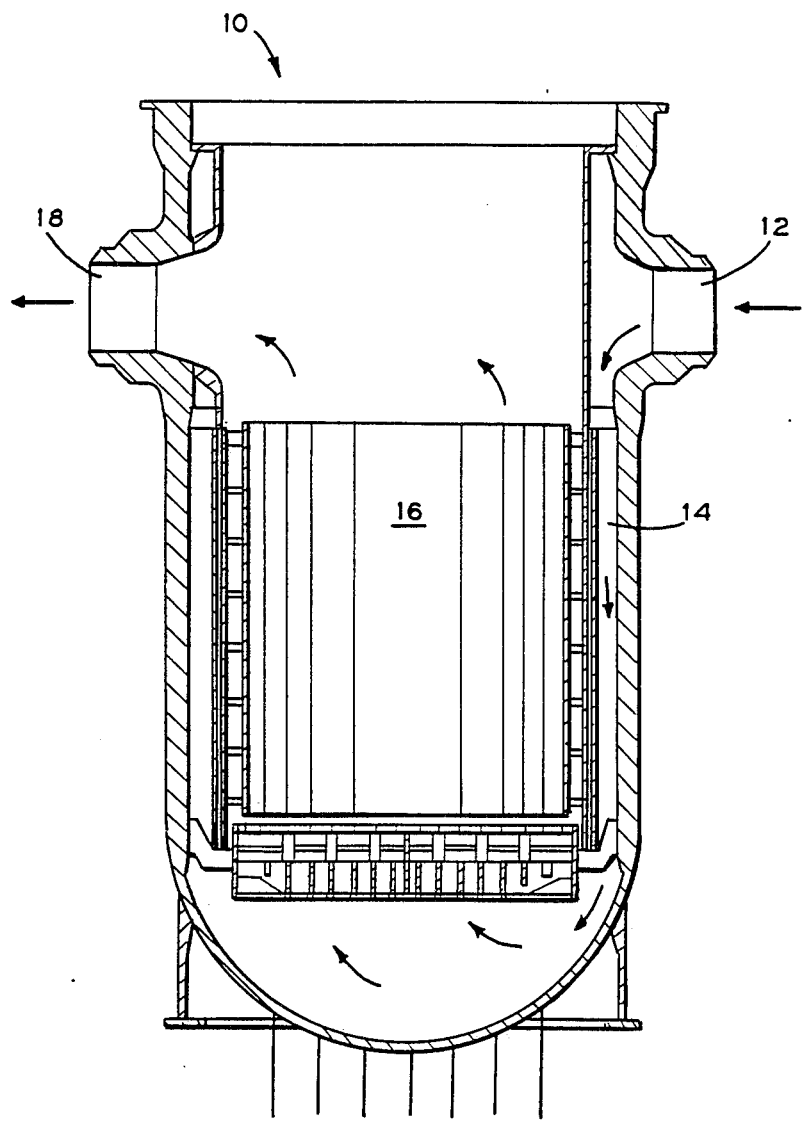
FIG. 1 illustrates a side sectional view of a typical pressurized water reactor.
Figure 2:
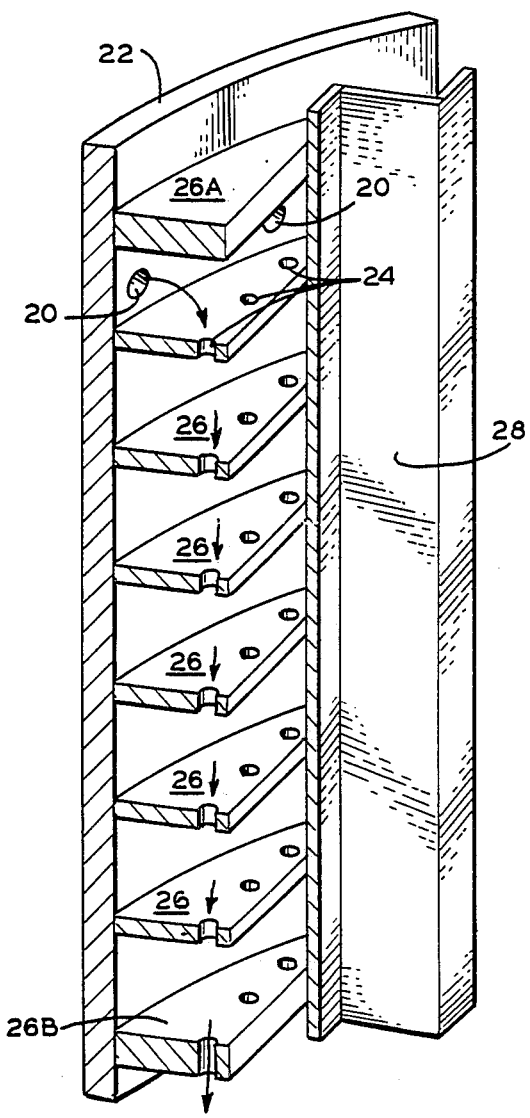
FIG. 2 illustrates a section of the core barrel, former plates, and baffle plates as they appear in the original downflow design.

Referring to the drawings, FIG. 1 illustrates a sectional view of a typical pressurized water reactor 10. In reactor 10, coolant flows thereinto through inlet nozzle 12, downward through annulus 14, upward through core region 16, and then out of reactor 10 through outlet nozzle 18. In the original design of some reactors as described above some of the coolant flows through horizontally positioned coolant flow holes 20 adjacent the upper end of core barrel 22 as best seen in FIG. 2. As indicated by the arrows, this bypass coolant flows downwardly through vertically positioned coolant flow holes 24 in former plates 26 and then upward through core region 16 with the main coolant flow. As seen in FIG. 2, the bypass coolant flows between core barrel 22 and baffle plate 28.

Figure 3:
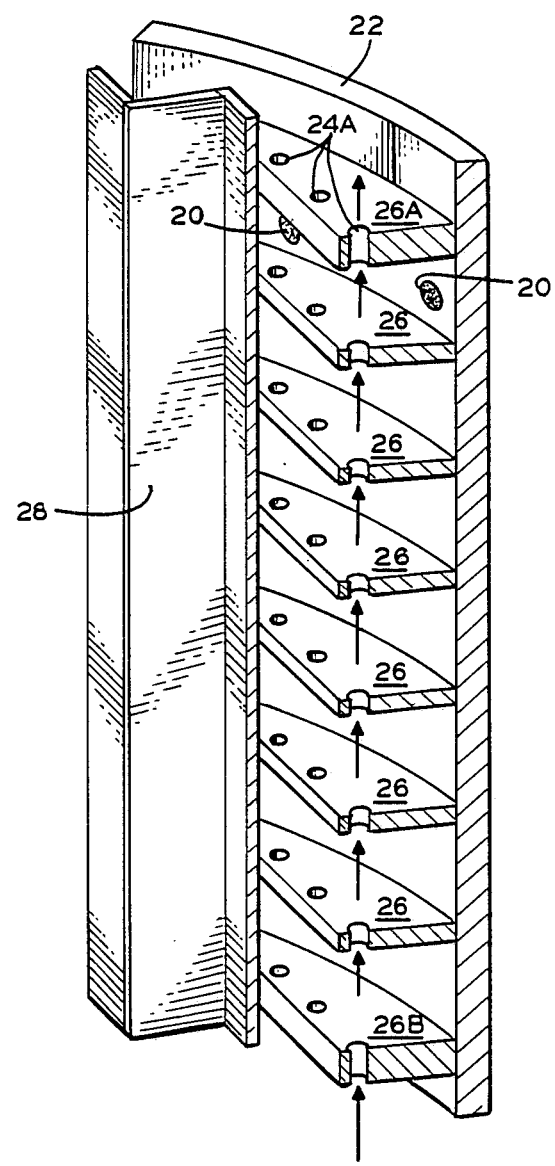
FIG. 3 illustrates a section of the core barrel, former plates, and baffle plates as they appear modified in the present inventive method.
Figure 4:
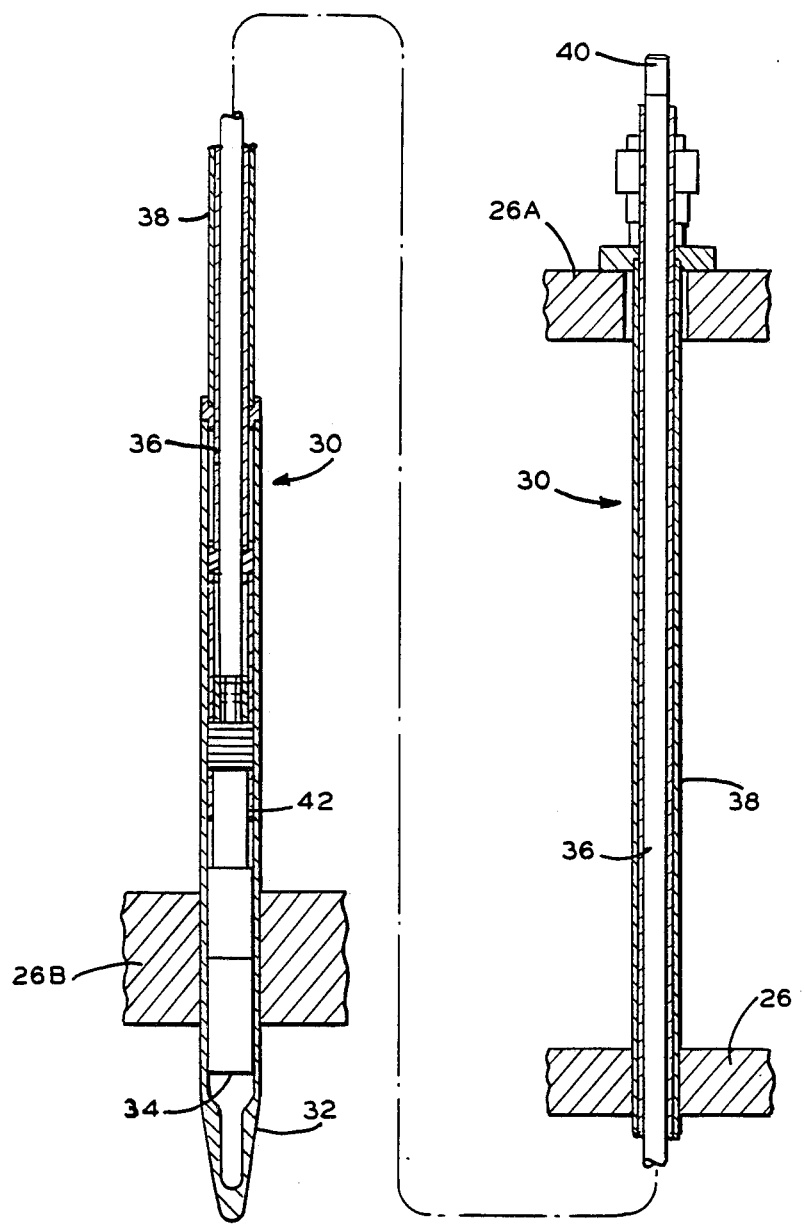
FIG. 4 illustrates a typical plug and plugging tool in position for installing a plug.
Figure 5:
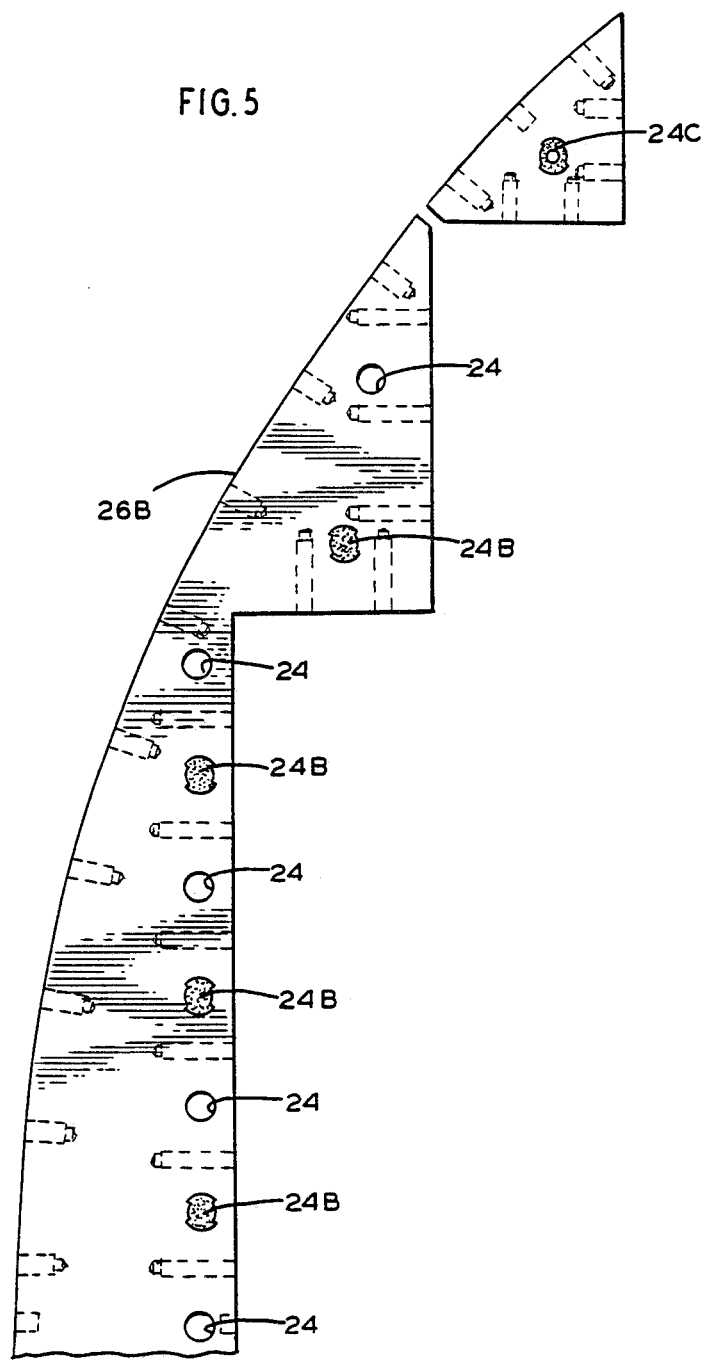
FIG. 5 illustrates a typical octant of the lower former plate plugged according to the method of the present invention.

The method presented for converting the vertically downward flow of bypass coolant through the core barrel and former plates to a vertically upward flow is best understood by reference to FIGS. 3–5. In FIG. 3, it is seen that one of the steps in making the conversion comprises providing holes 24A in top former plate 26A which are substantially in coaxial alignment with existing holes 24 in the intermediate and lower former plates 26. Another step is plugged horizontal coolant flow holes 20 in core barrel 22 adjacent top former plate 26A. A final step comprises plugging of selected holes in lower former plate 26B.

FIG. 4 illustrates a typical expander tool 30 and plug 32 which may be used for the plugging procedure. Expander tool 30 is comprised of roll expander 34, first and second tubes 36, 38, and torque shaft 40. Plug 32 is removably attached to expander tool 30 by means of left handed threads 42. First and second tubes 36, 38 form the body of expander tool 30 which serves to position and hold plug 32 and also to encase torque shaft 40. Torque shaft 40 is attached to roll expander 34 so as to cause expansion of plug 32 in response to rotation of torque shaft 40. The roll expansion process produces a tight joint between plug 32 and lower former plate 26B. Naturally, the tooling is designed for remote operation in plugging the core barrel and former plate and the tooling shown is intended only as an illustration of the type of tooling which should be acceptable for this type of operation.

FIG. 5 illustrates a typical octant of lower former plate 26B with the preferred plugging pattern of coolant flow holes 24 being illustrated. Coolant flow holes which remain unplugged according to the preferred pattern are designated by the numeral 24. It is seen that the preferred plugging pattern comprises plugging alternate coolant flow holes. Coolant flow holes which are fully plugged are designated by the numeral 24B. Coolant flow holes which are partially plugged are designated by the numeral 24C. As seen in FIG. 5 a typical octant of lower former plate 26B is provided with ten (10) coolant flow holes 24, four of which are fully plugged and one of which is partially plugged. Every fifth coolant flow hole is partially plugged. Coolant flow hole 24C has forty-four (44) percent of its flow area plugged according to the preferred embodiment. It can then be seen that according to the preferred plugging pattern forty (40) percent of coolant flow holes 24 in lower former plate 26B are fully plugged and ten (10) percent are partially plugged.

In operation the conversion method of the present invention is practiced as follows. Top former plate 26A is provided with coolant flow holes 24A substantially in coaxial alignment with existing coolant flow holes 24 in intermediate and lower former plates 26, 26B. Any suitable means such as drilling with remotely operated tools known in the art may be used. Coolant flow holes 20 in core barrel 22 are fully plugged using plugging techniques and equipment known in the art. Selected coolant flow holes 24B in lower former plate 26B are fully plugged while selected coolant flow holes 24C are partially plugged using techniques and equipment known in the art such as expander tool 30 described above. It is preferable to use an expander tool which can accommodate a certain minimum amount of offset between coolant flow holes 26 in adjacent former plates 26 which are not in perfect coaxial alignment.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method of converting a vertically downward flow of bypass coolant through a core barrel and former plates in a nuclear reactor to a vertically upward flow, comprising:
   a. providing coolant flow holes in the top former plate substantially in coaxial alignment with existing coolant flow holes in the intermediate and lower former plates;
   b. plugging coolant flow holes in said core barrel adjacent said top former plate; and
   c. plugging selected coolant flow holes in the lower former plate.

2. The method of claim 1, wherein the plugging pattern in said lower former plate comprises plugging alternate coolant flow holes.

3. The method of claim 2, wherein every fifth coolant flow hole plugged in said lower former plate is partially plugged.

4. The method of claim 3, wherein each of said partially plugged coolant flow holes has forty-four percent of its flow area plugged.

5. The method of claim 1, wherein said plugging of holes in said core barrel and said lower former plate is accomplished using a roll expander tool and plug.

6. A method of converting a vertically downward flow of bypass coolant through a core barrel and former plates in a nuclear reactor to a vertically upward flow, comprising:
   a. providing coolant flow holes in the top former plate substantially in coaxial alignment with existing coolant flow holes in the intermediate and lower former plates;
   b. plugging coolant flow holes in said core barrel adjacent said top former plate; and
   c. plugging alternate coolant fow holes in the lower former plate.

7. The method of claim 6, wherein every fifth coolant flow hole plugged in said lower former plate is partially plugged.

8. The method of claim 7, wherein each of said partially plugged coolant flow holes has forty-four percent of its flow area plugged.

9. The method of claim 6, wherein plugging of holes in said core barrel and said lower former plate is accomplished using a roll expander tool and plug.

10. A method of converting a vertically downward flow of bypass coolant through a core barrel and former plates in a nuclear reactor to a vertically upward flow, comprising:
    a. providing coolant flow holes in the top former plate substantially in coaxial alignment with existing coolant flow holes in the intermediate and lower former plates;
    b. plugging coolant flow holes in said core barrel adjacent said top former plate;
    c. plugging alternate coolant flow holes in the lower former plate wherein every fifth coolant flow hole plugged is partially plugged.

11. The method of claim 10, wherein each of said partially plugged coolant flow holes has forty-four percent of its flow area plugged.

12. The method of claim 10, wherein plugging of holes in said core barrel and said lower former plate is accomplished using a roll expander tool and plug.

* * * * *